(12) United States Patent
Gunderson et al.

(10) Patent No.: US 7,325,653 B2
(45) Date of Patent: Feb. 5, 2008

(54) THERMALLY COMPENSATED STANDPIPE ASSEMBLY FOR AUTOMATIC TRANSMISSION OIL FILL

(75) Inventors: Joel H Gunderson, Westland, MI (US); Thomas M Gutta, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 391 days.

(21) Appl. No.: 10/437,737

(22) Filed: May 14, 2003

(65) Prior Publication Data

US 2004/0226774 A1 Nov. 18, 2004

(51) Int. Cl.
*F01M 11/12* (2006.01)

(52) U.S. Cl. .................... 184/103.1; 184/1.5

(58) Field of Classification Search ............ 184/1.5, 184/103.1, 103.2; 137/386, 396; 261/70; 73/290 R, 292, 295, 301, 451, 426; 324/417
See application file for complete search history.

(56) References Cited

U.S. PATENT DOCUMENTS

| | | | | |
|---|---|---|---|---|
| 3,662,858 A * | 5/1972 | Peterson | ............... | 184/103.1 |
| 3,991,476 A | 11/1976 | Haines | ............... | 33/126.7 |
| 4,155,166 A | 5/1979 | Rochow et al. | ............... | 33/126.7 |
| 4,292,739 A | 10/1981 | Dobbins | ............... | 33/126.4 R |
| 4,649,746 A | 3/1987 | Snow | ............... | 73/290 R |
| 4,881,486 A | 11/1989 | Willis | ............... | 116/227 |
| 5,035,512 A * | 7/1991 | Tateishi et al. | ............... | 374/142 |
| 5,271,273 A | 12/1993 | Leunissen | ............... | 73/298 |
| 5,319,973 A * | 6/1994 | Crayton et al. | ............... | 73/290 V |
| 5,808,187 A * | 9/1998 | Gooden et al. | ............... | 73/118.1 |
| 5,887,613 A * | 3/1999 | Steinhardt | ............... | 137/395 |
| 6,012,550 A * | 1/2000 | Lee | ............... | 184/6.22 |
| 6,171,491 B1 | 1/2001 | Popoff et al. | ............... | 210/235 |
| 6,263,156 B1 * | 7/2001 | Ledoux | ............... | 392/337 |
| 6,371,158 B1 * | 4/2002 | Hou et al. | ............... | 137/565.37 |
| 2003/0221746 A1* | 12/2003 | Jacob | ............... | 141/98 |
| 2004/0140162 A1* | 7/2004 | Celini et al. | ............... | 184/103.2 |

* cited by examiner

*Primary Examiner*—Chong H Kim
(74) *Attorney, Agent, or Firm*—Harness, Dickey & Pierce, PLC

(57) ABSTRACT

A standpipe assembly for installation in the fluid sump of a vehicular transmission includes a two-piece fill pipe, a drain nut, a drain plug and a thermal actuator. The fill pipe includes a first tube having a first end secured in a flow passage formed in the drain nut and a second tube having a first end fitted for bi-directional sliding movement on a second end of the first tube. The drain nut is secured within a mounting bore formed through a housing of the transmission. The drain plug is adapted for threaded retention within the flow passage of the drain nut. The thermal actuator is operable for varying the length of the fill pipe by adjusting the position of the second tube relative to the first tube in response to thermal variations.

16 Claims, 5 Drawing Sheets

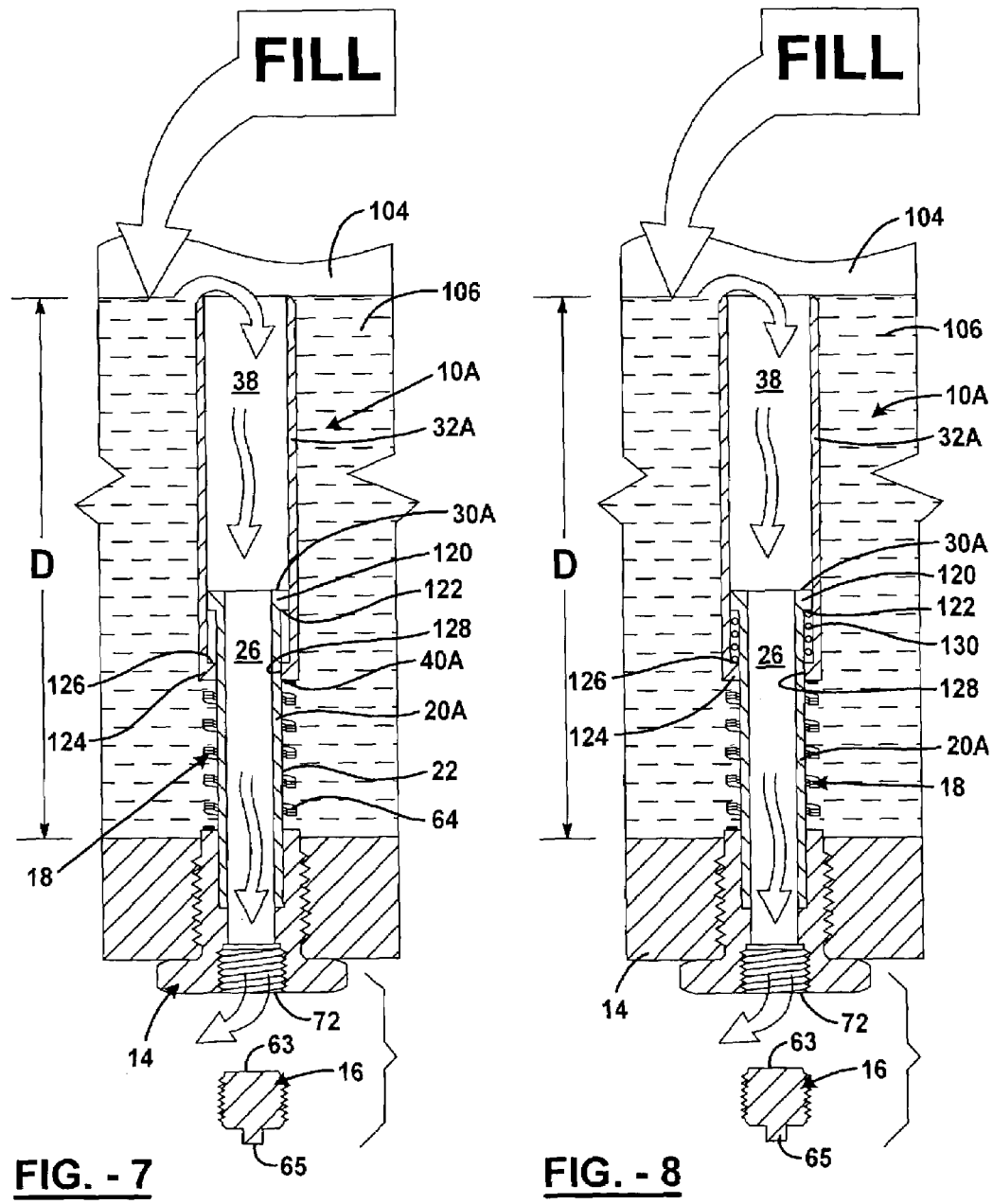

THERMALLY COMPENSATED STANDPIPE ASSEMBLY FOR AUTOMATIC TRANSMISSION OIL FILL

FIELD OF THE INVENTION

The present invention relates generally to the measurement of fluid levels in a reservoir and, more particularly, to an apparatus for automatically adjusting the fill level in the sump of an automatic transmission during an oil fill procedure to compensate for thermal variation.

BACKGROUND OF THE INVENTION

The oil fill procedure used in automatic transmissions typically involves adding transmission fluid after the geartrain has been cycled through its various gear states. Thereafter, a dipstick is used to visually determine if the actual oil fill level matches the recommended oil fill level. In some transmissions, side drain holes or a fixed-height standpipe mounted in the bottom of the sump are used to control the oil fill level. In both instances, the drain plugs are installed once the excess oil stops draining out, thereby setting the oil fill level.

As is well known, the oil level in the transmission sump can vary greatly due to changes in the fluid temperature. As such, specific temperature requirements must be accommodated to ensure proper filling of the sump to its recommended oil fill level, particularly during a service operation. These requirements typically include running the vehicle and cycling of the transmission for warming the transmission fluid to a normal operational temperature value prior to measuring and setting the oil fill level. Improper oil fill levels may detrimentally impact the service life of the transmission as well as compromise fuel economy, shift integrity, and other performance related characteristics. Thus, a need exists to provide an apparatus for permitting the sump of a motor vehicle transmission to be filled to its recommended oil fill level in a manner which accommodates variations in the fluid temperature.

SUMMARY OF THE INVENTION

Accordingly, the present invention relates to a standpipe assembly for use in association with an automotive transmission and which incorporates a novel thermal compensation feature.

As a related object of the present invention, the thermally-compensating standpipe assembly provides a mechanism for filling the sump of an automotive transmission to a recommended oil fill level while accommodating thermal variations in the transmission fluid. In particular, the thermal compensation feature functions to automatically adjust the height of a fill pipe to compensate for thermal variations in the transmission fluid, thereby ensuring a proper oil fill level regardless of the fluid temperature during an oil fill procedure.

According to another object of the present invention, the standpipe assembly includes a thermal actuator that is operable for adjusting the height of the fill pipe within the sump of the transmission in response to the temperature of the transmission fluid.

According to these and other objects of the present invention, the standpipe assembly includes a two-piece fill pipe, a drain nut, a drain plug and a thermal actuator. The fill pipe includes a first tube having a first end secured in a flow passage formed in the drain nut and a second tube having a first end fitted for bi-directional sliding movement on a second end of the first tube. Likewise, the drain nut is adapted for threaded retention within a mounting bore formed through the housing of the transmission. The drain plug is adapted for threaded retention within the flow passage of the drain nut. The thermal actuator is disposed between the drain nut and the first end of the second tube and is operable for varying the length of the fill pipe by adjusting the position of the second tube relative to the first tube in response to thermal variations.

In a preferred form, the thermal actuator is a bi-metallic biasing device that is operably disposed between an end surface of the drain nut and an end surface of the second tube. The length of the bimetallic biasing device varies in relation to the temperature of the fluid it is exposed to in the transmission sump, thereby causing a corresponding variation in the length of the fill pipe. Once the length of the fill pipe has been set, based on the thermally-compensating characteristic of the bimetallic biasing devides, the drain plug is removed and excess fluid is discharged from the sump through a continuous flow pathway established between a second end of the second tube and the flow passage in the drain nut.

In accordance with an alternative embodiment of the present invention, the fill pipe can also include a collar arrangement for permitting smooth sliding movement of the second tube relative to the first tube. The collar arrangement also functions to define a maximum adjusted fill pipe length.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings wherein:

FIG. 7 is a sectional view of a standpipe assembly according to a second embodiment of the present invention;

FIG. 8 is similar to FIG. 7 except that a standpipe assembly according to a third embodiment of the present invention is shown during a fill;

DETAILED DESCRIPTION OF THE PREFERRED EMBODIMENTS

The present invention is generally related to a thermal compensation mechanism which is well suited for use in fluid-filled products where precise control of the fluid level is required, regardless of the fluid temperature. More particularly, the present invention is directed to a standpipe assembly for use with a motor vehicle transmission and which includes a thermal actuator that is operable to automatically adjust the height of a fill pipe in response to the temperature of the fluid. It is to be understood, however, that the following description of preferred embodiments is intended only to be exemplary in nature and is not to be interpreted to limit the invention, its applications or uses.

Figure 1:
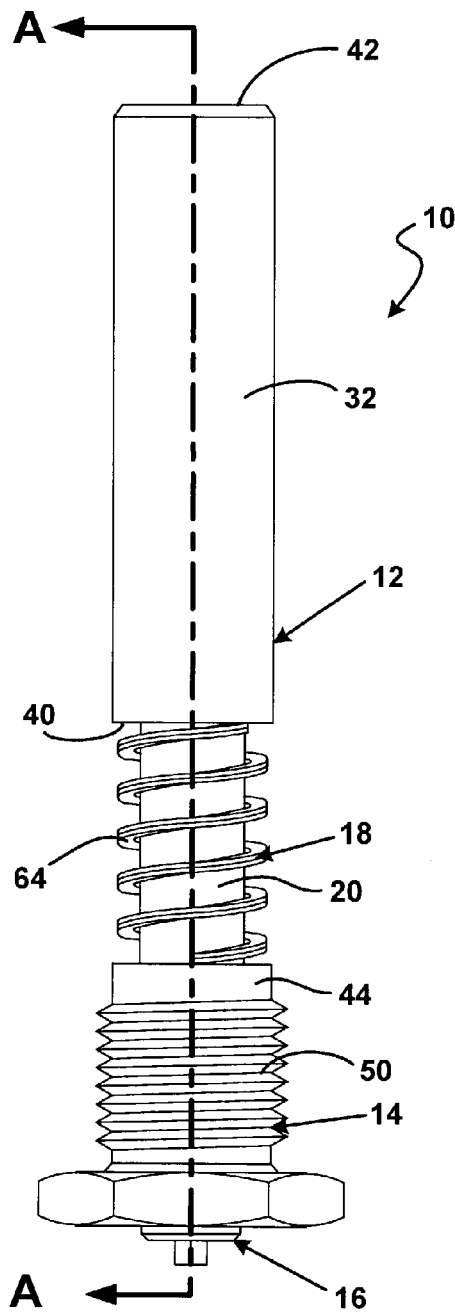
FIG. 1 shows a standpipe assembly according to a preferred embodiment of the present invention.
Figure 2:
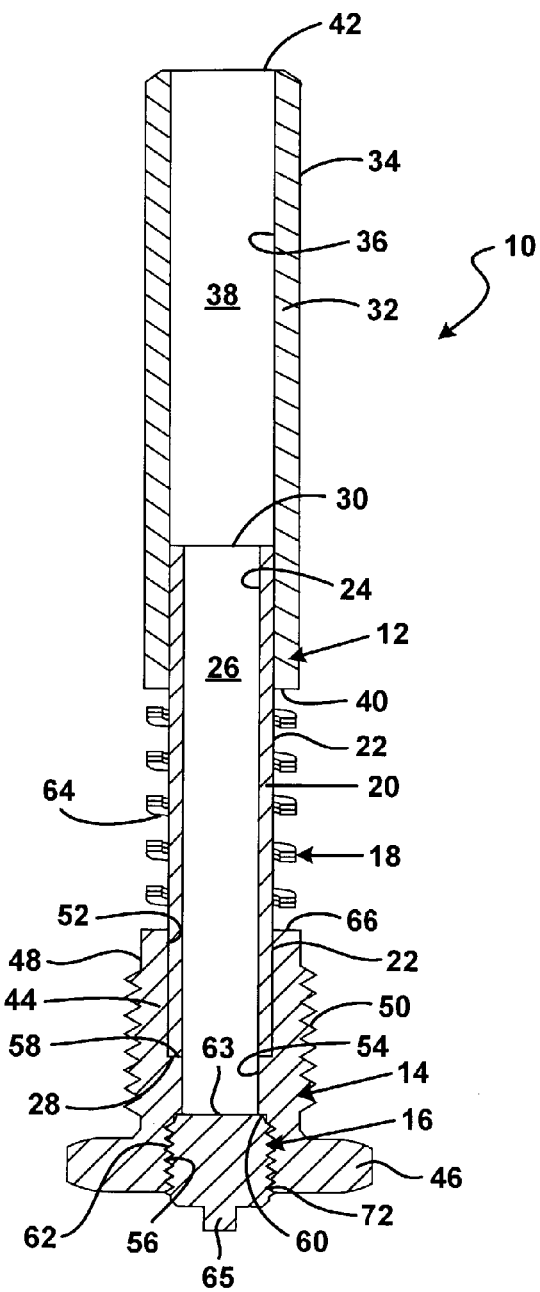
FIG. 2 is a sectional view of the standpipe assembly taken along line A-A of FIG. 1.

Referring primarily to FIGS. 1 and 2 of the drawings, a standpipe assembly 10 is shown to include a two-piece fill pipe 12, a drain nut 14, a drain plug 16 and a thermal compensator 18. File pipe 12 includes a first cylindrical tube 20 having an outer wall surface 22, an inner wall surface 24 defining a first flow passage 26, and first and second open ends 28 and 30, respectively. Fill pipe 12 also includes a second cylindrical tube 32 having an outer wall surface 34, an inner wall surface 36 defining a second flow passage 38, and first and second open ends 40 and 42, respectively. As best seen from FIG. 2, a portion of first tube 20 adjacent its second open end 30 is disposed within a portion of second tube 32 adjacent to its first open end 40. In particular, inner wall surface 36 of second tube 32 and outer wall surface 22 of first tube 20 are sized so as to permit relative sliding movement of second tube 32 relative to first tube 20. Furthermore, first flow passage 26 is shown to communicate with second flow passage 38.

Drain nut 14 is shown to include a cylindrical body segment 44 and a nut segment 46. Body segment 44 has an outer wall surface 48 on which external threads 50 are formed. Body segment 44 further includes a first cylindrical bore 52, a second cylindrical bore 54, and a third cylindrical bore 56 having internal threads formed therein. The interface between second bore 54 and first bore 52 defines a first or upper radial shoulder surface 58 while the interface between second bore 54 and threaded third bore 56 defines a second or lower radial shoulder surface 60.

As best seen in FIG. 2, a lower portion of first tube 20 is disposed in first bore 52 of body segment 44 with its first end 28 seated on upper radial shoulder 58. Preferably, first tube 20 is rigidly secured (such as by welding, adhesives or an interference fit) to drain nut 14 so as to prevent relative axial movement therebetween. When assembled, the diameter of inner wall 24 of tube 20 is preferably similar to that of second bore 54 in drain nut 14 such that second bore 54 defines a common flow passage with flow passage 26. Drain plug 16 includes external threads 62 which are adapted for threaded engagement with internally-threaded bore 56 in drain nut 14. When drain plug 16 is fully installed in drain nut 14, its end surface 63 seats against lower shoulder 60 and prevents fluid within flow passage 26 from being discharged through a drain port 72. Drain plug 16 includes a hex lug 65 which can be captured by a suitable hex tool to permit drain plug 16 to be selectively removed from or installed in drain port 72.

Figure 3:
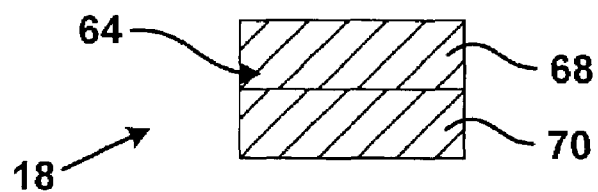
FIG. 3 is a sectional view through the thermal actuator associated with the standpipe assembly of the present invention.
Figure 4:
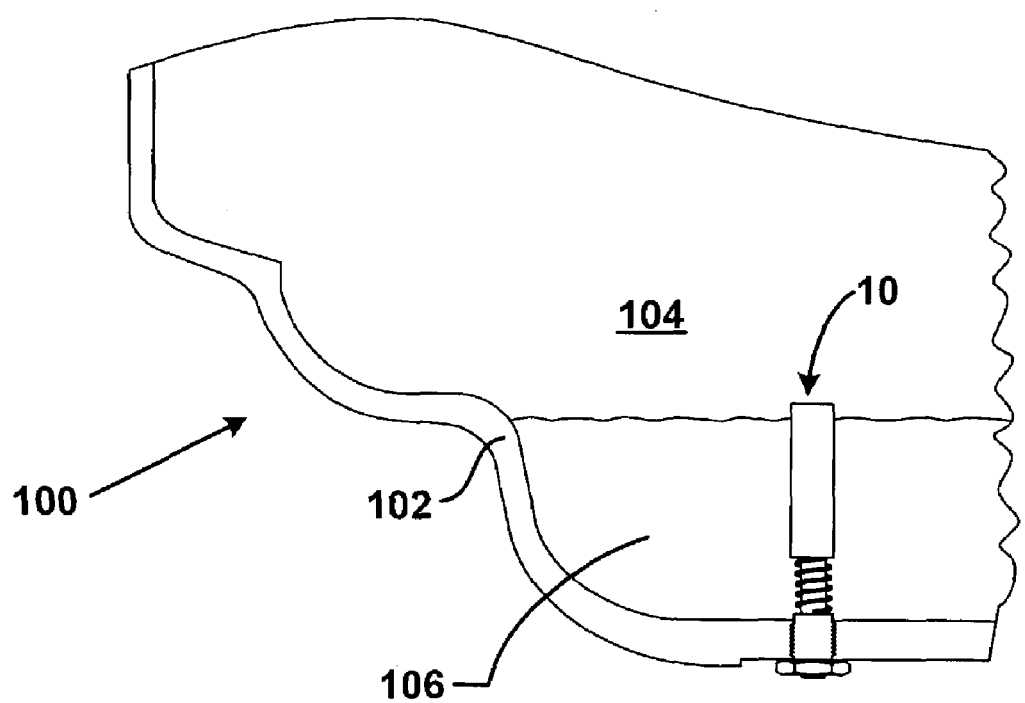
FIG. 4 is an environmental view showing the standpipe assembly of the present invention installed in the sump of an exemplary transmission housing.

According to the present invention, thermal actuator 18 is operable to automatically vary the overall height of fill pipe 12 in response to the temperature of a fluid acting thereon. In particular, thermal actuator 18 is shown as a helical coil spring 64 which surrounds an intermediate portion of first tube 20. Coil spring 64 has its first or upper end segment acting against first end 40 of first tube 20 and its second or lower end segment acting against an end surface 66 on body segment 44 of drain nut 14. As seen from the partial sectional view provided by FIG. 3, coil spring 64 is fabricated from a bimetallic spring material having a layer of a first material 68 laminated to a layer of a second material 70. In a preferred arrangement, first material 68 is copper and second material 70 is steel. However, alternative materials capable of providing a temperature dependent length compensation feature are considered to be equivalent to the structure described. Use of a bimetallic material causes the length of coil spring 64 to increase when exposed to increasing fluid temperatures and to decrease when exposed to decreasing fluid temperatures. The particular type of materials and their physical dimensions (width, thickness, etc.) are selected to provide a desired relationship between fluid temperature and length variation. Furthermore, it should be understood that any device capable of changing length in response to, and as a function of, changing temperature could be used as a thermal actuator to adjust the height of fill pipe 12.

Referring now to FIGS. 4 through 7, standpipe assembly 10 is shown in association with a transmission 100 of the type used in motor vehicles. Transmission 100 includes a housing 102 that defines a fluid reservoir or oil pan, hereinafter referred to as sump 104, that is shown to be partially filled with a suitable fluid, such as a transmission oil 106. Standpipe assembly 10 is shown with external threads 50 on body segment 44 of drain nut 14 in threaded engagement with internal threads 110 in a mounting bore 112 formed through housing 102, whereby fill pipe 12 and thermal actuator 18 are located within sump 104 and directly exposed to fluid 106. Nut segment 46 is provided to permit a predefined installation torque to be applied during threaded engagement of threads 50 and 110 so as to provide a fluid tight seal between housing 102 and drain nut 14. When drain plug 16 is installed in drain nut 14, it prevents oil 106 within flow passages 38, 26 and 54 from draining out of housing 102 through drain port 72.

Figures 5, 6:
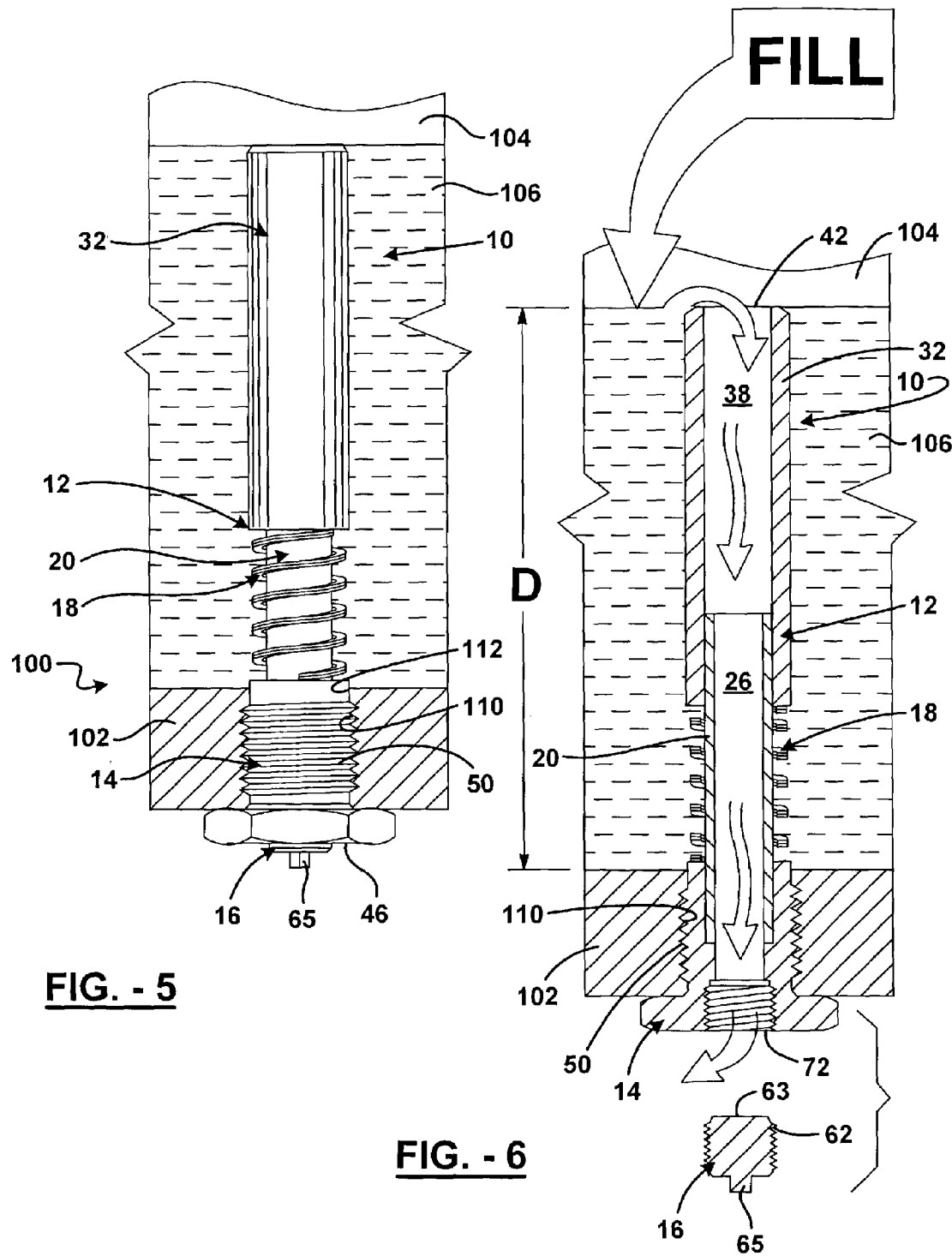
FIG. 5 illustrates the standpipe assembly of the present invention installed in the transmission housing.
FIG. 6 is a sectional view of FIG. 5 showing the standpipe assembly of the present invention during a fluid fill event.
Figure 9:
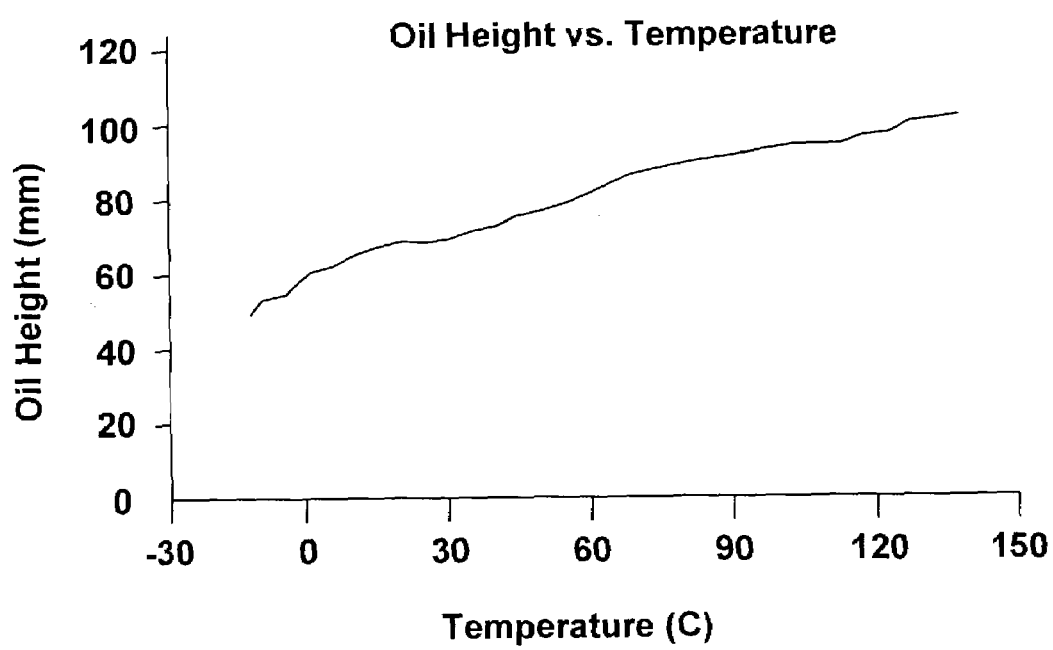
FIG. 9 graphically illustrates a typical oil height versus oil temperature relationship that is accommodated by the thermally-compensating standpipe assembly of the present invention.

With particular reference to FIGS. 5 and 6, operation of standpipe assembly 10 during an oil fill procedure will now be described. The oil filling event may be conducted during initial assembly of transmission 100 or during a service operation to replace the fluid within sump 104. If the event is an initial oil filling, standpipe assembly 10 is installed in transmission 100 prior to delivery of transmission oil 106 through a fill neck (not shown) into sump 104. In contrast, during a service filling event, standpipe assembly 10 is removed from transmission 100 to permit the exhausted oil to be drained out of sump 104 through mounting bore 112. Thereafter, standpipe assembly 10 would be reinstalled in transmission 100 in preparation for sump 104 being filled with new oil.

In either event, once standpipe assembly 10 is installed in mounting bore 112, drain plug 16 is removed from drain port 72 and new fluid is delivered into sump 104 via the fill neck. As oil 106 fills sump 104, it comes into direct contract with bimetallic coil spring 64. The temperature of oil 106 causes a corresponding amount of extension or compression of coil spring 64. This temperature-dependent movement of coil spring 64 results in corresponding movement of second tube 32 relative to first tube 20 for establishing a "temperature compensated" fill height level, which is denoted by "D" in FIG. 6. With second tube 32 in its thermally compensated position relative to first tube 20, any fluid in excess of that required to fill sump 104 to the temperature-compensated fill level will flow over the top of open end 42 and flows through passage 38 in second tube 32, passage 26 in first tube 20 and passage 54 in drain nut 14 until it is discharged from drain port 72. An indication that the proper fill level has been achieved is provided when oil 106 stops flowing out of drain port. Thereafter, drain plug 16 is re-installed into drain nut 14 and no further oil is poured into the filler neck.

FIG. 7 illustrates a modified version of a standpipe assembly 10A which is substantially similar to standpipe assembly 10 with the exception that a collar arrangement has been incorporated into the sliding connection between first tube 20A and second tube 32A. For sake of brevity and clarity, components of standpipe assembly 10A which are similar, but slightly modified, to those previously described have been identified with common reference numerals with an "A" suffix indicating a structural modification. As seen, end 30A of first tube 20A has a radial flange 120 defining a stop surface 122. Likewise, first end 40A of second tube 32A has a radial flange 124 defining an abutment surface 126 and a central aperture 128 through which outer wall surface 22 of first tube 20A extends. Thermally-compensating bi-metallic coil spring 64 is shown with one of its end segments engaging radial flange 124 so as to bias second tube 32A for locating its open end 42 in a position corresponding to the desired fill height, as again denoted by "D". This collar arrangement acts to limit upward movement of second tube 32A relative to first tube 20A upon engagement of abutment surface 126 with stop surface 122, thereby defining a maximum oil fill height within sump 104. This arrangement also promotes smooth sliding movement of second tube 32A relative to first tube 20A since flanges 120 and 124 act as guide journals.

FIG. 8 is generally similar to FIG. 7 except that standpipe assembly 10A is now shown equipped with a biasing spring 130 in the chamber formed between flanges 120 and 124. Biasing spring 130 is operable to bias second tube 32A into engagement with the end of coil spring 64.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. In a transmission for a motor vehicle having a housing defining a fluid sump and a mounting bore communicating with the sump, a standpipe assembly comprising:
    a first tube extending from the mounting bore so as to extend into the sump, said first tube defining a first flow passage and a first uniform outer diameter along its length;
    a second tube having a first end and a second end supported for sliding movement relative to said first tube and defining a second flow passage which communicates with said first flow passage, said second tube defining a second uniform outer diameter along its entire length;
    a threaded drain nut having an outer wall surface defining a mounting diameter adapted for engagement with threads formed in the mounting bore for securing said drain nut to the housing, said mounting diameter being at least equal to said first and second outer diameters, respectively; and
    a thermal actuator operable for biasing the second tube in a first direction to vary the position of said second tube relative to said first tube in response to changes in the temperature of fluid in the sump, wherein said thermal actuator engages said first end of said second tube and said threaded drain nut.

2. The standpipe assembly of claim 1 wherein said first tube has a first end secured to the housing and a second end, said second tube has a first end disposed for sliding movement on said second end of said first tube and a second end defining an inlet to said second flow passage.

3. The standpipe assembly of claim 2 wherein said thermal actuator surrounds said first tube and engages said first end of said second tube, said thermal actuator operable for moving said inlet of said second tube from a first position to a second position in response to a change in the fluid temperature in the sump increasing from a first temperature value to a second temperature value.

4. The standpipe assembly of claim 3 wherein movement of said inlet of said second tube to its second position corresponds to a higher fluid level in said sump.

5. The standpipe assembly of claim 3 wherein said thermal actuator is a coil spring made from a material capable of varying length dimension of said coil spring in response to variations in the temperature of the fluid in the sump.

6. The standpipe assembly of claim 5 wherein said coil spring is made from a bi-metallic material.

7. The standpipe assembly of claim 1 further comprising:
    a drain plug adapted for retention in said drain port of said drain nut to prevent fluid from draining out of the housing; and
    wherein said first tube is secured to said drain nut with its first flow passage communicating with a drain port through said drain nut.

8. The standpipe assembly of claim 1 wherein said second tube has an end segment which surrounds an end segment of said first tube, said end segment of said first tube includes a radial flange having an end surface facing an inner wall surface of said second tube, and wherein said end segment of said second tube includes a radial flange having an end surface facing an outer wall surface of said first tube.

9. The standpipe assembly of claim 8 further including a biasing spring disposed between said radial flanges of said first and second tubes.

10. In a transmission for a motor vehicle having a housing defining a fluid sump and a mounting bore communicating with the sump, a standpipe assembly comprising:
    a first tube extending from the mounting bore so as to extend into the sump, said first tube defining a first flow passage and a first uniform outer diameter along its length;
    a second tube having a first end and a second end supported for sliding movement relative to said first tube and defining a second flow passage which communicates with said first flow passage, said second tube defining a second uniform outer diameter along its length;
    a threaded drain nut having an outer wall surface defining a mounting diameter adapted for engagement with threads formed in the mounting bore for securing said drain nut to the housing, said mounting diameter being at least equal to said first and second outer diameters, respectively; and
    a bimetal spring interposed between said second tube and said threaded drain nut and operable for biasing said second tube in a first direction to vary the position of said second tube relative to said first tube in response to changes in the temperature of fluid in the sump, wherein said bimetal spring engages said first end of said second tube and said threaded drain nut.

11. The standpipe assembly of claim 10 wherein said first tube has a first end secured to the housing and a second end, said second tube has a first end disposed for sliding movement on said second end of said first tube and a second end defining an inlet to said second flow passage.

12. The standpipe assembly of claim 11 wherein said bimetal spring surrounds said first tube and engages said first end of said second tube, said bimetal spring operable for moving said inlet of said second tube from a first position to a second position in response to a change in the fluid temperature in the sump increasing from a first temperature value to a second temperature value.

13. The standpipe assembly of claim 12 wherein movement of said inlet of said second tube to its second position corresponds to a higher fluid level in said sump.

14. The standpipe assembly of claim 12 wherein said bimetal spring is made from a material capable of varying a length dimension thereof in response to variations in the temperature of the fluid in the sump.

15. The standpipe assembly of claim 10 further comprising:
- a drain plug adapted for retention in said drain port of said drain nut to prevent fluid from draining out of the housing; and
- wherein said first tube is secured to said drain nut with its first flow passage communicating with a drain port through said drain nut.

16. The standpipe assembly of claim 10 wherein said second tube has an end segment which surrounds an end segment of said first tube, said end segment of said first tube includes a radial flange having an end surface facing an inner wall surface of said second tube, and wherein said end segment of said second tube includes a radial flange having an end surface facing an outer wall surface of said first tube.

* * * * *